United States Patent [19]

Magnus

[11] Patent Number: 5,558,507
[45] Date of Patent: Sep. 24, 1996

[54] HOSE PUMP USING ANGULARLY STAGGERED ECCENTRIC DISKS WITH PROJECTING STUB SHAFTS

[75] Inventor: Eberhard Magnus, Remscheid, Germany

[73] Assignee: Mastermark Corporation, Louisville, Ky.

[21] Appl. No.: 331,499

[22] PCT Filed: Jan. 28, 1993

[86] PCT No.: PCT/EP93/00187

§ 371 Date: Oct. 28, 1994

§ 102(e) Date: Oct. 28, 1994

[87] PCT Pub. No.: WO93/22558

PCT Pub. Date: Nov. 11, 1993

[30] Foreign Application Priority Data

Apr. 29, 1992 [DE] Germany ............................ 9205733 U

[51] Int. Cl.$^6$ .................................................. F04B 43/08
[52] U.S. Cl. ........................... 417/474; 74/567; 29/888.22
[58] Field of Search ................................ 417/474, 475, 417/478, 479, 238; 29/888.1, 888.22, 525; 74/567, 568 R

[56] References Cited

U.S. PATENT DOCUMENTS

| | | | |
|---|---|---|---|
| 3,981,633 | 9/1976 | Wall | 417/474 |
| 4,072,448 | 2/1978 | Loyd, Jr. | 74/568 R |
| 4,597,365 | 7/1986 | Madaffer | 74/567 |
| 4,638,683 | 1/1987 | Ogawa et al. | 74/567 |
| 4,648,812 | 3/1987 | Kobayashi et al. | 417/474 |
| 4,725,205 | 2/1988 | Cannon et al. | 417/474 |
| 4,755,109 | 7/1988 | Botts | 417/474 |
| 5,263,830 | 11/1993 | Goi et al. | 417/474 |

FOREIGN PATENT DOCUMENTS

| | | | |
|---|---|---|---|
| 2543300 | 2/1977 | Germany . | |
| 104786 | 6/1942 | Sweden | 417/474 |
| 548551 | 4/1974 | Switzerland . | |
| 1716193A1 | 2/1992 | U.S.S.R. | 417/474 |

*Primary Examiner*—Timothy S. Thorpe
*Assistant Examiner*—Peter G. Korytnyk
*Attorney, Agent, or Firm*—Wheat, Camoriano, Smith & Beres, PLC

[57] ABSTRACT

The invention relates to a hose pump with pushers (2) arranged one behind the other in the direction of extension of the hose (4), the edges (3) of which act in rhythmic alternation on the hose (4) and which are controlled by angularly staggered eccentric disks (7) which rotate about a common axis (x—x). In order to provide a structurally advantageous system, the common axis (x—x) is made up of stub shafts (8) which project on one side of an eccentric disk (7) and engage in corresponding recesses (9) in the adjacent eccentric disk (7).

17 Claims, 11 Drawing Sheets

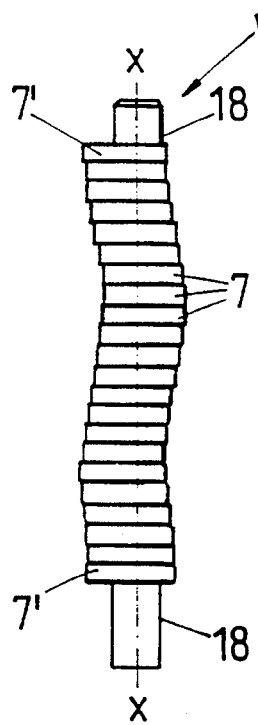
FIG.3
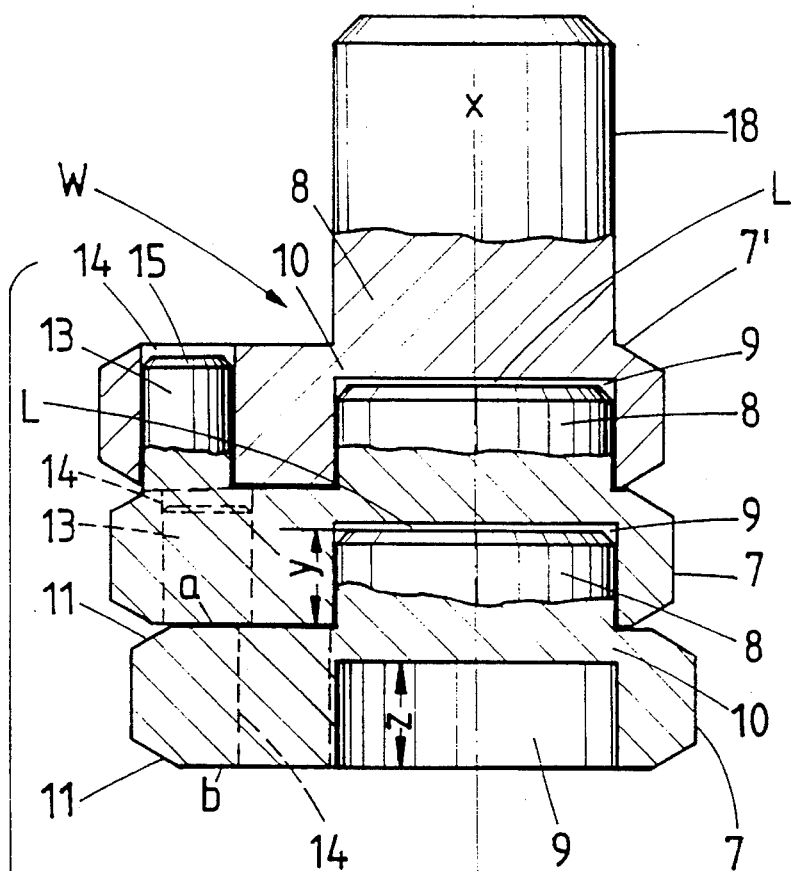
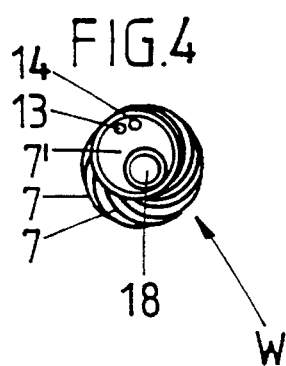
FIG.4
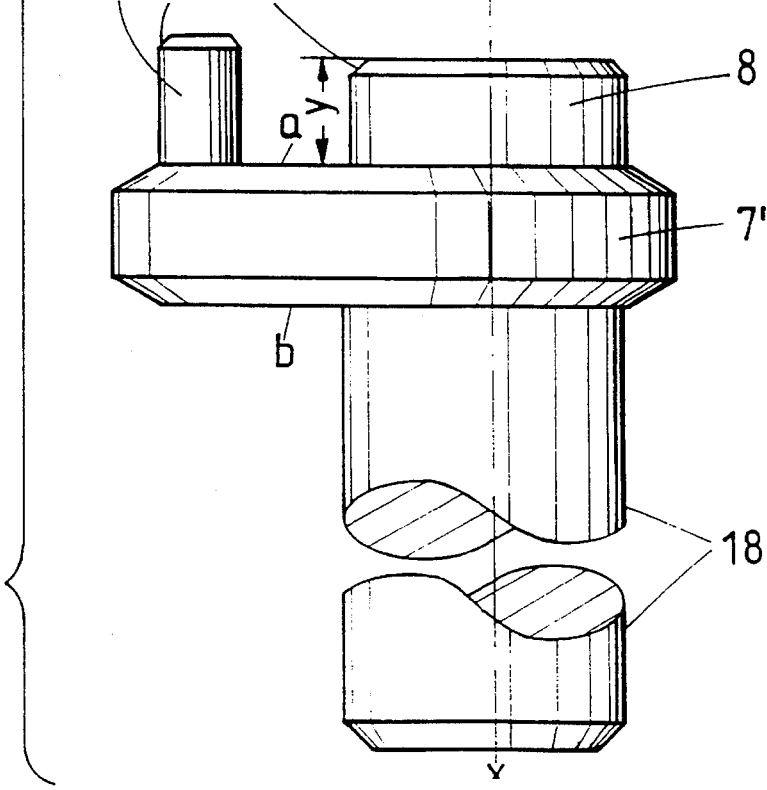
FIG.5

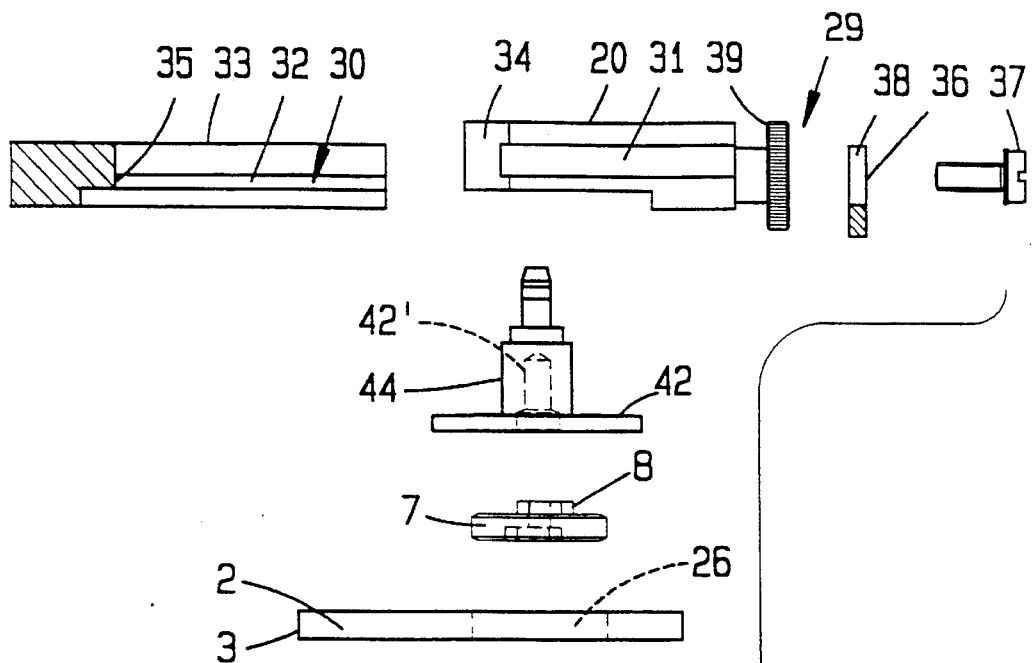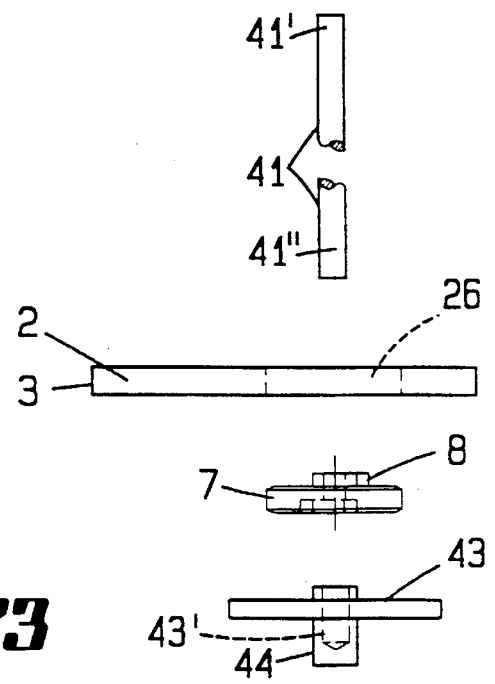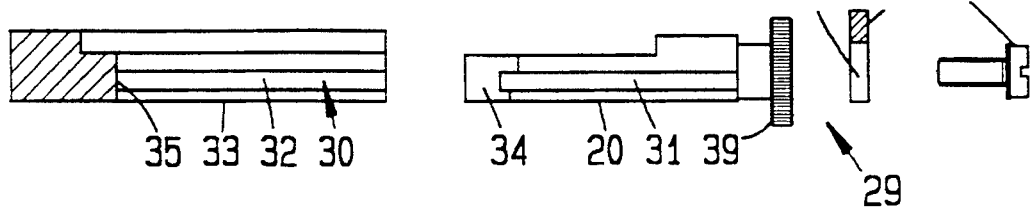

HOSE PUMP USING ANGULARLY STAGGERED ECCENTRIC DISKS WITH PROJECTING STUB SHAFTS

FIELD AND BACKGROUND OF THE INVENTION

The present invention relates to a hose pump with pushers arranged one behind the other in the direction of extension of the hose, the edges of which act in rhythmic alternation on the hose and which are controlled by angularly staggered disks which rotate about a common axis.

A hose pump of this type is known from Federal Republic of Germany OS 25 43 300. The rhythmically controlled pushers act as squeezing means. By a suitably wave-shaped structure, they gently press out the amount which has been precisely separated from the remaining supply. The entire unit is based on the precise development and association of the eccentric disks to each other. The eccentric disks are drilled through eccentrically. The holes created in this manner receive a shaft which passes through all the disks. The securing for rotation is obtained by connecting pins which lie on the side and extend over the gap between the eccentric disks. Two radially equally spaced apart openings of corresponding cross section are produced in each eccentric disk. The stacked position of the eccentric disks is secured by threaded sockets at the ends, i.e. by support shoulders formed by them.

SUMMARY OF THE INVENTION

The object of the present invention is to simplify the construction of the central control element of such a hose pump, namely the so-called eccentric shaft, with a reduction of the individual parts without reducing the desired precision, and this while obtaining a basic concept which is favorable for assembly.

According to the invention the common axis (x—x) is made up of stub shafts (8) which project on one side (a) of an eccentric disk (7) and engage in corresponding recesses (9) in the adjacent eccentric disk (7).

As a result of this development, a hose pump of this type which is of simplified structural shape is obtained. The precision rotating part consisting of the shaft is eliminated. The forming of the shaft is taken over by the eccentric disks. In this way, by addition of the eccentric disks, the final length required in each case is also obtained; no shafts of different length need by kept ready. Specifically, in this connection the common shaft is formed by stub shafts each of which protrudes from the one side of an eccentric disk and engage in corresponding recesses in the adjacent eccentric disk. In this way, due to the position of the eccentric disks one above the other, a load-bearing support side against side is obtained; no tilting takes place; even with stacks of longer length, the individual pieces which add to each other to form the geometrical axis are satisfactorily coaxial. Furthermore, there is no loss of material, since the accumulation of material which creates the stub shaft is obtained substantially from the volume of the recess. Consistent with this, the stub shafts are integral with the eccentric disks, which may suitably even consist of plastic. This can be achieved by injection molding with the use of plastic of high crystallinity, the stub shafts being furthermore adjacent to insertion pins which are also formed from the same part and engage in holes in adjacent eccentric disks so as to fix the angularly staggered arrangement of the eccentric disks. With regard to the sparing use of material, reference is had to what has been stated above. On the other hand, in the event that larger loads are to be expected on the eccentric disks, shearing can easily be counteracted by the use of two or more insertion pins and corresponding holes. In order, for instance, to counteract unfavorable tolerance pairings of the eccentric disks which are connected by insertion pins with each other, it is furthermore proposed that the protrusion of the stub shafts be less than the depth of the recesses which receive them. This is similarly true also of the insertion pins and holes. In this way, any burrs become without effect. A flat application of the eccentric disks side against side is in this way assured. From the standpoint of the supporting, an advantageous development of the eccentric shaft created in this manner is obtained if the eccentric disks are associated with end closure disks one of which has a journal pin coaxial to the recess and the other, coaxially opposite the stub shaft, also has a journal pin. The axial securing or clamping of the package of eccentric disks formed by stacking is obtained by the supporting of the outer wide surfaces of the closure disks on bearing walls of the journal pins. Corresponding bearing walls thus serve as bearing plates of for instance an insertable housing of the hose pump. Finally, an optimizing of the development of the eccentric shaft is obtained by a polygonal shape of the stub shaft and a corresponding polygonal shape of the cross section of the recesses. Thus, the stub shafts themselves can provide the assurance of rotation. In this connection, a hexagonal shape of the stub shafts can be used, it engaging into a corresponding internal hexagon which serves as recess. In this connection, the use of a friction seat facilitates the assembly. In order to be able to change the core of such a hose pump rapidly to different squeezing profiles without having to disassemble the entire hose pump, it is proposed that the eccentric disks which lie one above the other and the pushers be combined into a package by bearing walls which are arranged at the two ends, which package can be pulled out of the insertable housing via a rail guidance of the bearing walls which form a carriage. This requires only a fraction of the time which was previously necessary for refitting and represents a measure of even independent importance. Furthermore, this basic construction has the result of facilitating assembly. Finally, any repair work which may be required is also substantially easier. In order in this connection to be able to leave the drive path unchanged, automatic disengagement of the eccentric-disk rotary-drive wheel is provided upon removal of the package; that is, no intermediate drive member, whether disk or gear, is present in the removal path. The operating position of the package, on the other hand, is reliably maintained by a barrier which blocks the bearing walls from being pulled out. Only after an intentional elimination of this barrier can the displacement in question be effected. In particularly advantageous manner, the barrier is developed as a latch plate. A development which is particularly dependable in use is present if both bearing walls which are arranged one above the other are secured by such a barrier developed in plate shape. In order to avoid the dropping out of the many functional parts inserted one within the other upon the pulling out of the package, the invention proposes a bearing-wall connecting bar which passes through the eccentric disks and extends up into the bearing walls. In this way, eccentric disks and pushers remain together. In particular, the helical staggering of the eccentric disks with respect to each other is not done away with. The holding together is preferably maintained by friction lock between the connecting bar and the bearing walls. There may be concerned here a sort of clamping fit, and therefore a force fit, which permits the taking apart of the package only by the action of greater axial separating forces. For the arrangement thereof, the region of the stub shafts of the eccentric disks is used. The disks are broken through centrally so that the connecting bar extends in the common axis of the eccentric disks. It secures the corresponding alignment of the disks as additional indexer. Finally, one advantageous feature of the invention also consists therein that the rails of the rail guides are developed on bearing guide plates which can be fixed on the insertable housing. Such bearing guide plates are the stationary part of the bearing walls and contribute to the stability of the insertable housing. Finally, it is advantageous for the face ends of the bearing guide plates to bear holding screws for the latch plate. The latch plates need simply be placed over the screw shanks. The screws are then tightened, with the clamping fast of the latch plate or plates, by means of the screwy heads.

BRIEF DESCRIPTION OF THE DRAWINGS

The invention with respect to the development of the eccentric disks is explained in further detail below on basis of two embodiments shown in the drawings and, with respect to the development of a carriage-guided package, by one embodiment. In the drawings:

FIG. 3 shows by itself the eccentric shaft incorporated in the hose pump, namely in side view.

FIG. 4 is a top view thereof;

FIG. 5 shows the eccentric shaft, greatly enlarged, partially in section, limited to two eccentric disks and two end closure disks;

FIG. 21 shows the pusher package in an exploded view;

FIG. 22 shows the upper bearing guide plate in a vertical section; and

FIG. 23 shows the lower bearing guide plate in a vertical section.

DETAILED DESCRIPTION OF THE PREFERRED EMBODIMENTS

Figure 2:
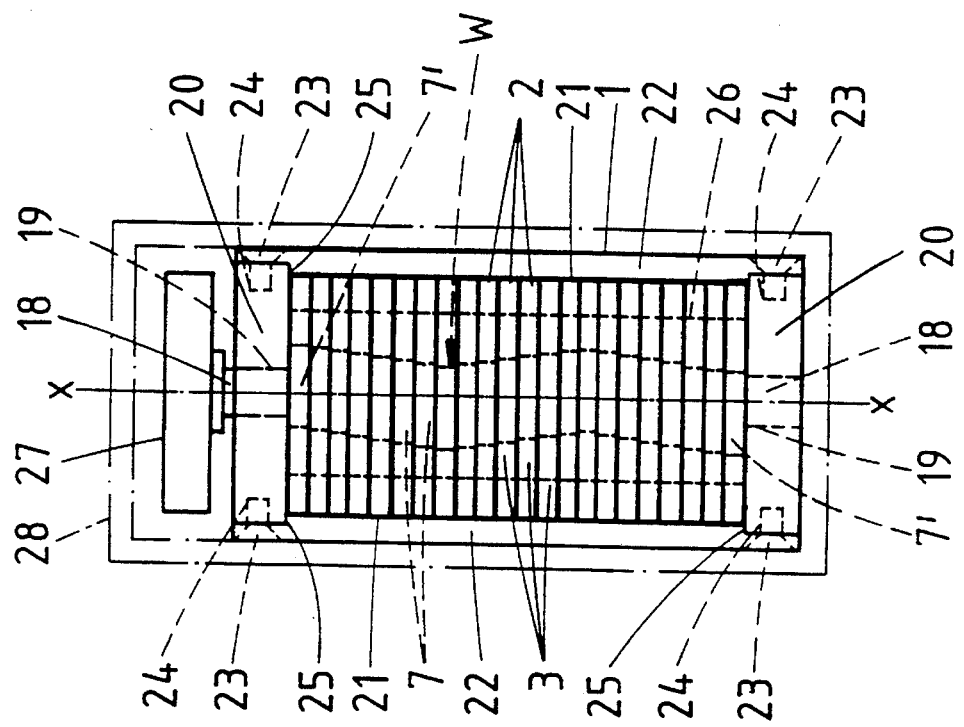
FIG. 2 is a side view thereof.

The hose pump shown comprises an eccentric shaft W, an insertable housing 1 supporting it, as well as a block of laminations formed of a large number of individual pushers 2 as squeezing means.

The corresponding squeezing contour is formed by the free-standing edges 3 of the pushers 2 which are stacked so as to form a package of plates. The free-standing edges 3, in rhythmic alternation, strike transversely against a hose 4.

The hose 4 passes through a vertically oriented receiving chamber 5. The latter is limited at the front by a support wall 6 which is developed at the same time as a door. This support wall has, on the hose side, a spring-loaded, preferably vertically grooved application plate. The spring-loading is directed towards the edges 3.

The eccentric shaft W can be assembled, corresponding to the desired squeezing contour, from individual eccentric disks 7 in such a manner that an upper constriction 4' and a lower constriction 4" of the hose 4 are produced, through the vertical distance between which the dosaged amount removed from the supply (not shown) is conveyed in the direction of the arrow x'. The helically protruding eccentric disks 7 rotate about a common axis x—x. This axis extends vertically, as does the course of the hose.

The common axis x—x results from a coaxial addition of stub shafts 8 in this vertical direction. For this purpose, one such stub shaft 8 is formed on each eccentric disk 7 on its one side a. In this case, it is symmetrical. This stub shaft 8 engages into a corresponding recess 9 on the other side b of the adjacent eccentric disk 7, lying above it.

Figure 10:
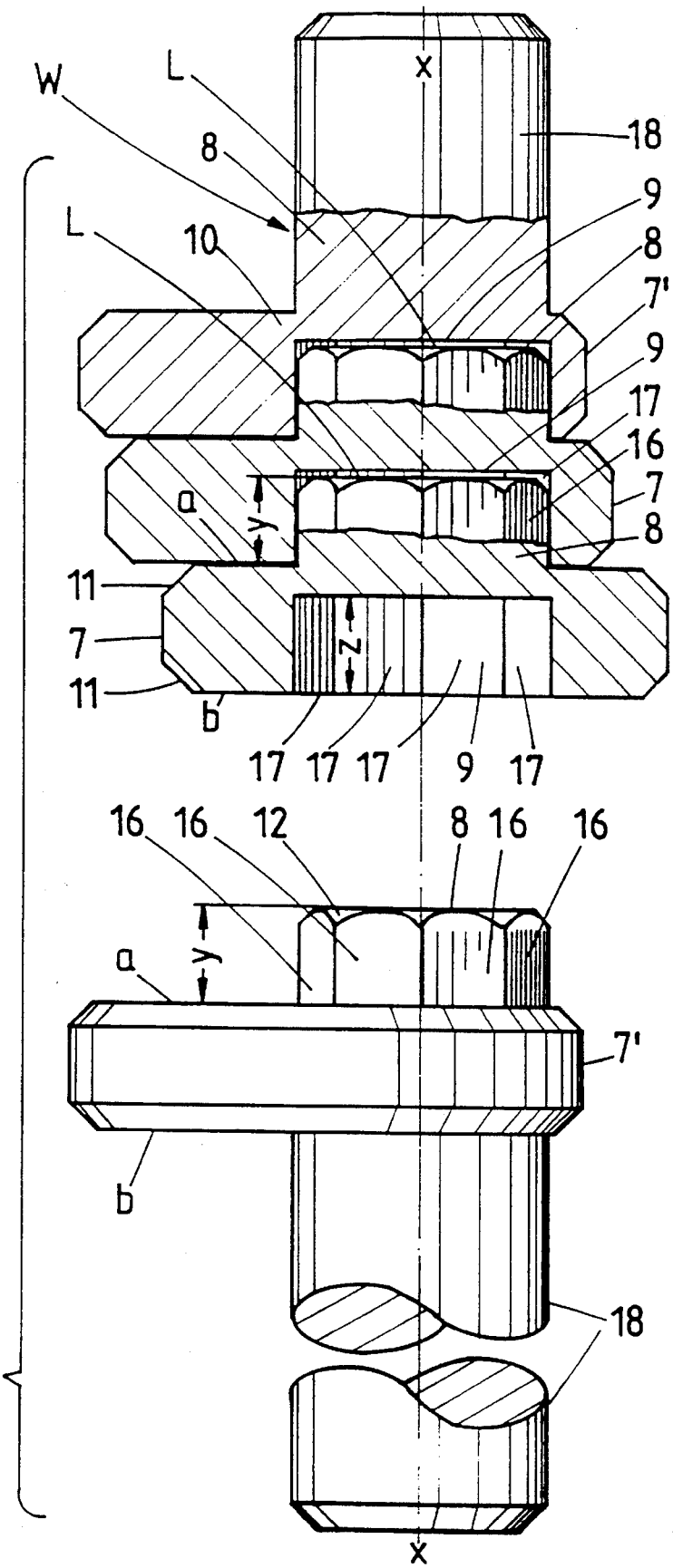
FIG. 10 shows the eccentric shaft in an enlarged, partially exploded view, again showing only two eccentric disks and the corresponding closure disks.
Figure 11:
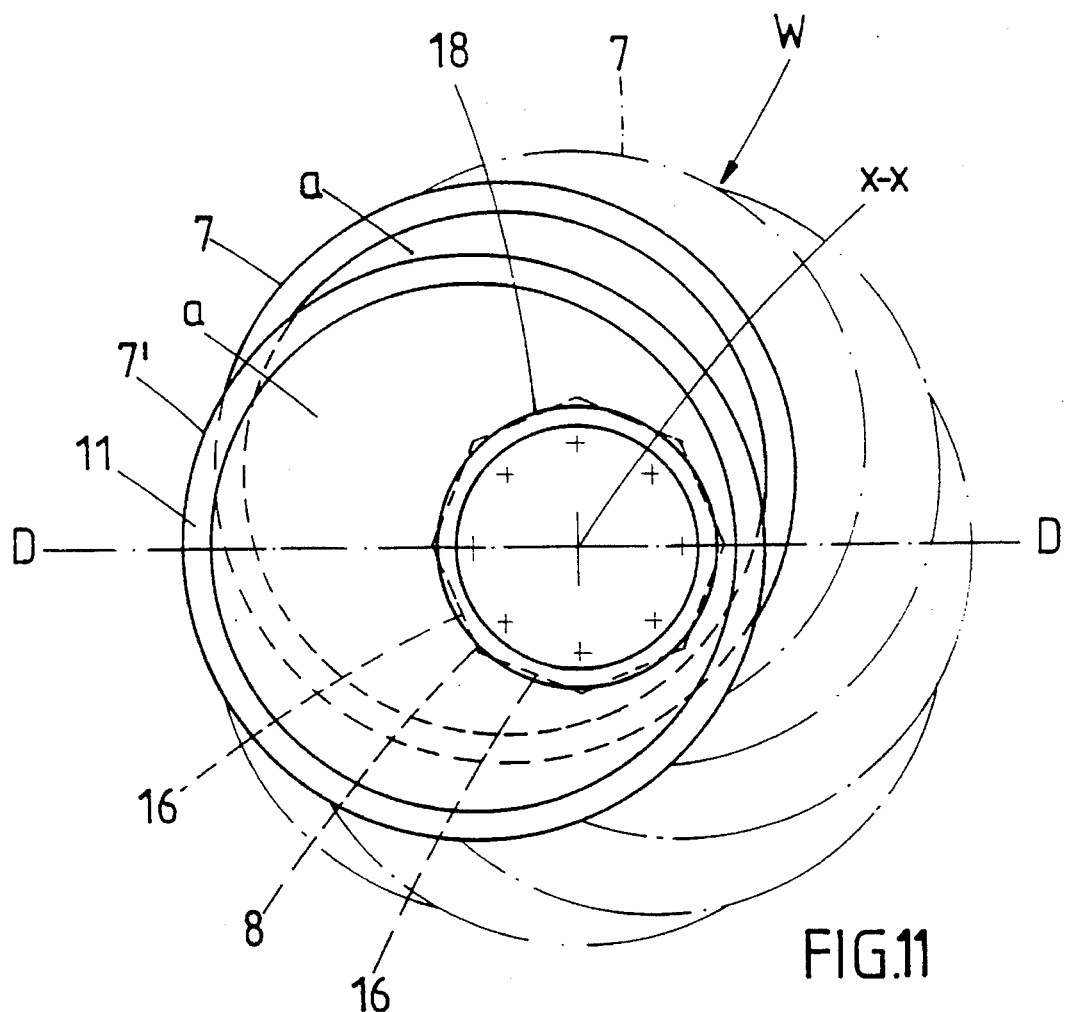
FIG. 11 is a top view of FIG. 5, now looking on the closure disk.
Figure 12:
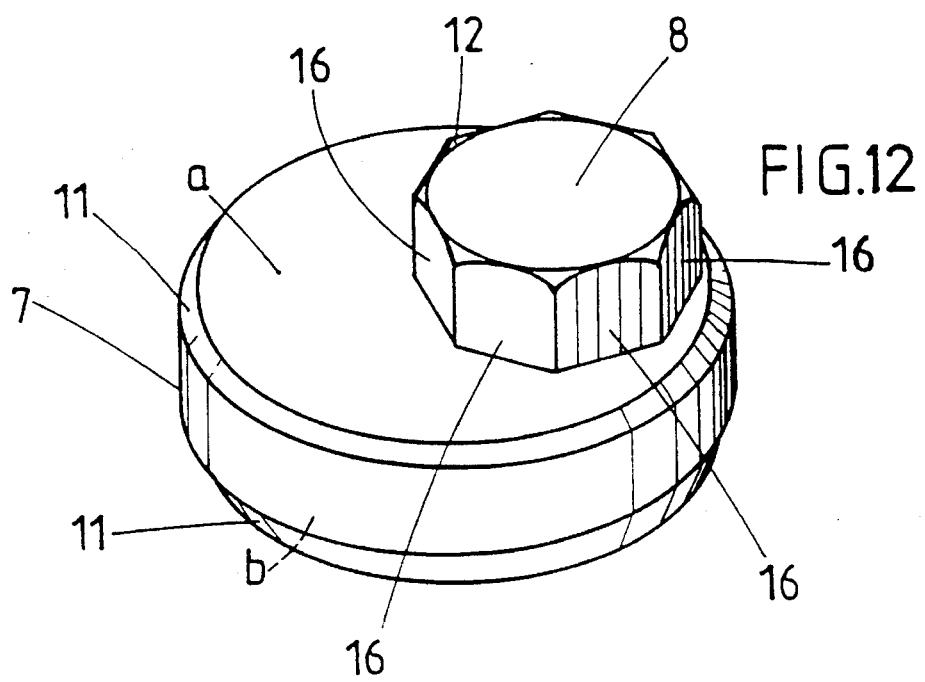
FIG. 12 is a perspective view of the eccentric disk in accordance with the second embodiment.

The axially directed protrusion y of the eccentric stub shaft 8 which extends from the circular eccentric disk 7 is less than the depth z of the recess 9 measured in this direction. This leads to a snug, supporting surface stacking of the eccentric disks 7, the sides a and b of which are precisely perpendicular to the axis x—x. The axial distance between the flat bottom surface of the recess 9 and the flat end surface of the stub shaft 8 can be clearly noted as air gap L from FIGS. 5 and 10.

As can furthermore be noted from said figures, about three-quarters of the thickness of the eccentric disk 7 is used for the depth z. Thus, there still remains a highly stable, annular attachment zone 10 between the region of the foot of the stub shaft 8 and the disk body.

Both edges of the eccentric disk 7 which extend with rotational symmetry are beveled. The beycling is indicated by the reference numeral 11. The edge of the exposed stub shaft 8 is beveled at 12. The edge of the recess 9, on the other hand, retains its polygonal transition in the interest of an application surface of maximum size.

The stub shafts 8 are developed integral with the eccentric disks 7, preferably as a result of injection molding. Here, plastic is may suitably be used. Should manufacture by stamping from metal be preferred, it is advantageous that the volume which forms the recess 9 create, by coaxial displacement, the stub shaft 8, which is approximately of the same volume.

As means for securing the rotation of the eccentric disks 7 which are added for the eccentric shaft W shown, there is used an insertion pin 13. The latter proceeds from the one side, designated a, and extends parallel in space to but radially spaced from the axis x—x of the stub shaft 8. The diameter of the cylindrical insertion pin 13 corresponds approximately to one-third to one-fourth of the diameter of the stub shaft 8. The axial length of the insertion pin 13 is somewhat less than the thickness of the eccentric disk 7. In order to secure the angularly staggered arrangement of the eccentric disks 7 said insertion pin 13 enters into a corresponding hole 14 in the next following eccentric disk 7. The hole 14 is a continuous cylindrical opening in the sense of a bore hole.

Figure 6:
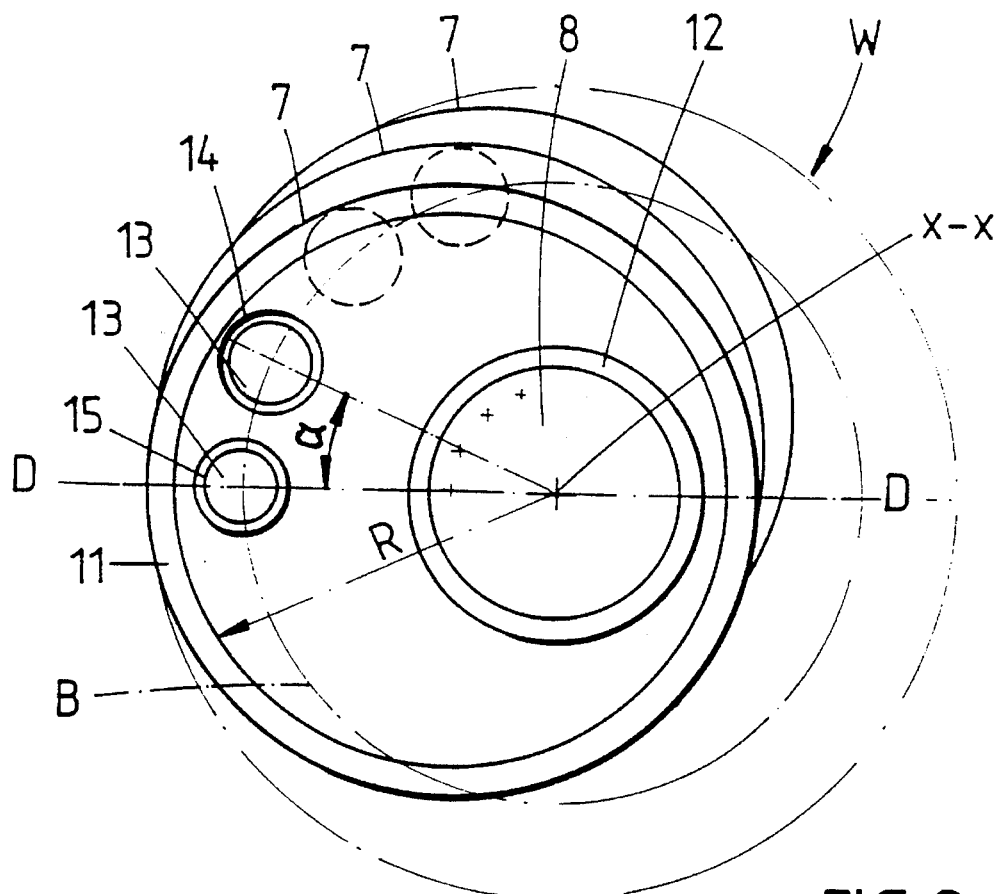
FIG. 6 is a top view of FIG. 5, with the closure disk omitted.
Figure 7:
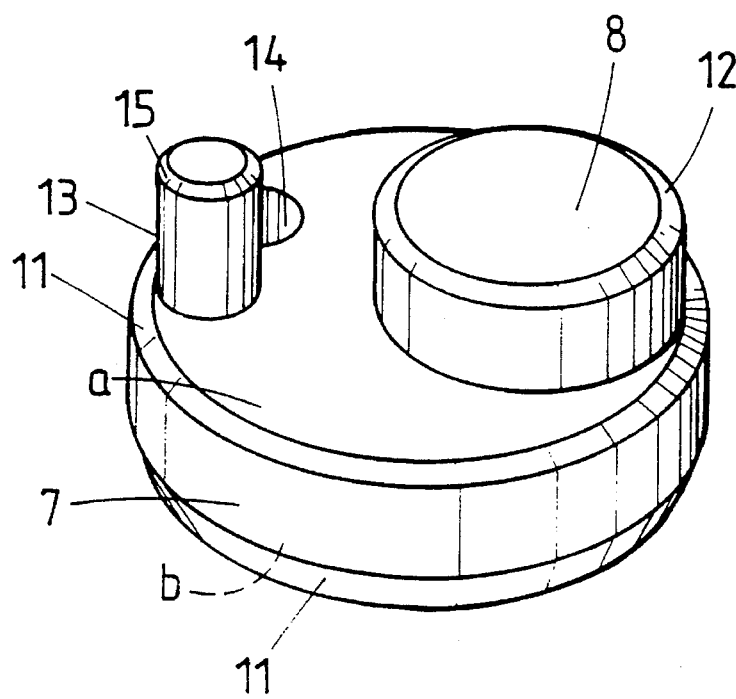
FIG. 7 is a perspective view of an eccentric disk.
Figure 8:
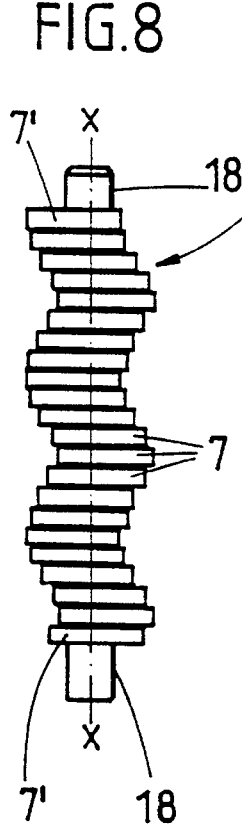
FIG. 8 is an individual showing of the eccentric shaft in accordance with the second embodiment.
Figure 9:
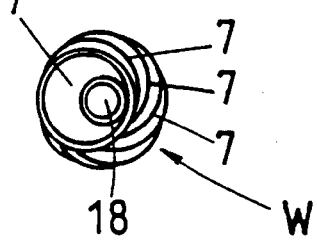
FIG. 9 is a top view thereof.

The insertion pin 13, which is also developed integral, is beveled at its end. It is seated as close as possible to the edge of the eccentric disk 7, but still outside the bevel 11. As can be noted from FIG. 6, stub shaft 8 and insertion pin 13 are both arranged on a diameter D—D. In clockwise direction following the insertion pin 13 of each eccentric disk 7 there is arranged the said hole 14, namely on the same radial arc B as the insertion pin 13. The radius which intersects the axis x—x is designated R. The angular distance between the insertion pin 13 and the hole 14 is about 25°. It is indicated in the drawing as alpha.

The means which means which result in the securing of rotation can also be provided two or more times, this also in the direction of the free field to the diameter D—D which is present for use of the counterclockwise direction.

In the embodiment shown in FIGS. 8 to 12, the corresponding rotation-securing means are developed on the stub shaft 8 itself in the manner that in this case the stub shaft is not of a cylindrical shape as in the embodiment described above but has a non-circular, preferably polygonal, outer wall. In accordance with this polygonal nature of the stub shafts 8 of the eccentric disks 7, the cross section of the recess 9 of the disks is also polygonal. Specifically, an octagonal structure is taken as basis. The polygonal surfaces of the stub shaft 8 are provided with the reference numeral 16. The corresponding polygonal surfaces of the recess 9 bear the reference numeral 17. Instead of an equal-angle octagonal division, a more widely-used hexagonal cross-sectional shape can be taken as basis, namely engagement of an external hexagon into a hexagon socket.

It will be understood that the individual addition of the eccentric disks 7 of both embodiments results in the operating length of the axis x—x. Physically, the bearing-referred means are so shaped that the eccentric disks 7 have closure disks 7' at their end. The closure disks are of basically the same construction as the eccentric disks 7. They differ merely by the fact that from the one, upper closure disk 7' adjoining the snub shaft 8 of cylindrical shape there is an extension of the same cross section which forms a journal pin 18. In other words, the cylindrical stub shaft 8 is extended upwards coaxial to the recess 9. The other closure disk 7' located at the bottom is also of the same basic type, only that here, instead of the downward-directed recess 9, coaxially opposite the top-side stub shaft 8 of cylindrical or polygonal shape there extends coaxially thereto, from the other side b, namely the bottom side of the eccentric disk, a similar journal pin 18. It also is cylindrical.

As an alternative, the journal pins 18 can also be of a smaller diameter than the cylindrical stub shaft 8.

With regard in this respect to the second embodiment, the same means are employed there. The reference numerals have been employed accordingly, but without repetition in the text. Of course, the journal pins 18 therein are also cylindrical.

The eccentric shaft W of both of the embodiments which is obtained in this manner from the assembled shaped parts finds its mounting holes 19 at both ends in plate-like bearing walls 20 of the insertable housing 1. The oppositely directed inner sides of the horizontal bearing walls 20 form the vertical support for the package of eccentric disks in the manner that, in each case, the outer wide surface of the closure disks 7', comparable to the side a or b of the "normal" eccentric disks 7, comes against the said inner side. The package of eccentric disks is thus clamped axially secured.

The mounting holes 19 can be provided with bearing bushings.

The two horizontally extending bearing walls 20 are connected via vertical walls 22 which provide inner sides 21. The vertical walls are attached by screws and are thus reversible. The corresponding fastening screws bear the reference numeral 23. They pass through the vertical walls 22 into the lengthwise narrow sides of the bearing walls 20. Their threaded holes are designated 24. Said narrow sides rest on supporting shoulders 25 of the vertical walls 22 so that at all times a well-defined holding together which assures the clamping and inclusion of the pushers 2 is assured.

The pushers 2 are rectangular plates of plastic or metal. Their narrow longitudinal sides are guided along the parallel inner sides 21 of the vertical walls 22.

Each eccentric disk 7 extends within the cross-sectional region of one pusher 2, which for this purpose has an opening 26 which is adapted to the diameter of the eccentric disk and is developed as a slot oriented transversely to the squeezing movement which is directed towards the hose.

Figure 1:
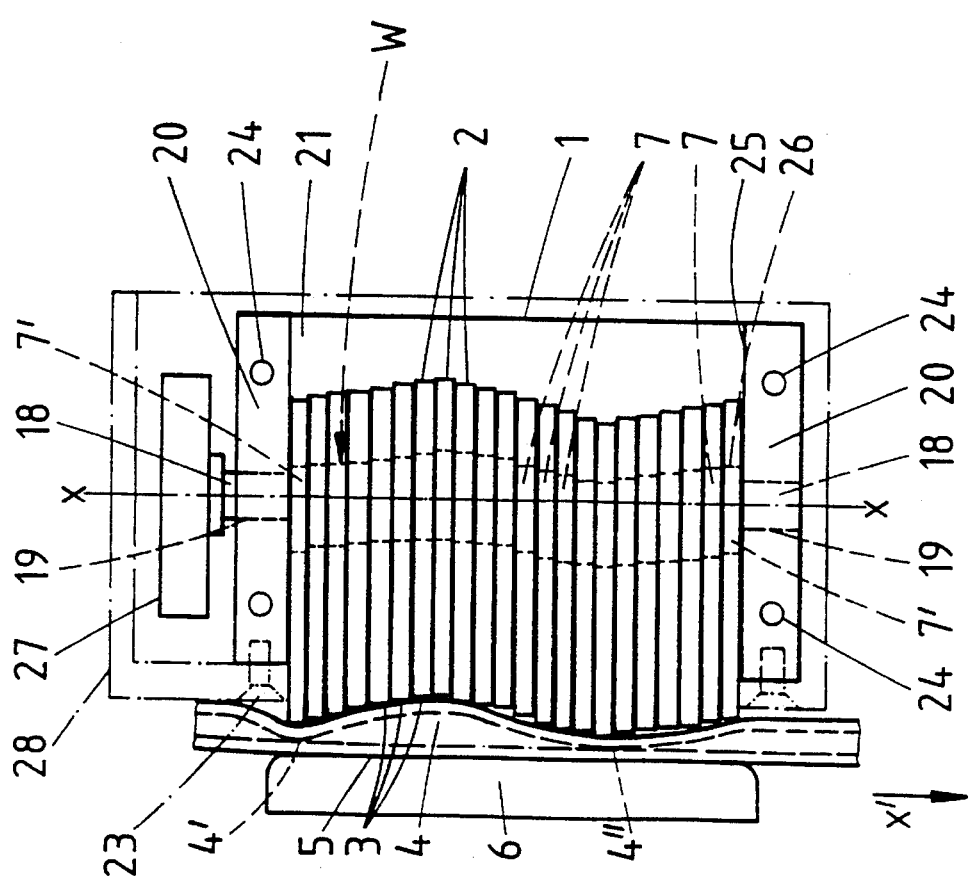
FIG. 1 shows the hose plump developed in accordance with the invention with insertable housing partially disassembled for easier viewing, in accordance with the first embodiment.

As can be noted From FIG. 1, the eccentric shaft W receives its rotational drive about the vertical axis x—x via a gear wheel 27 or the like which is connected with the upper journal pin 18. The pump housing which receives the insertable housing 1 is shown in dot-dash line and bears the reference numeral 28.

FIGS. 13 to 23, while retaining the basic principle which has been explained above, show a structural solution which permits the refitting of the hose pump by manual turning. At the same time, however, this also has advantages from the standpoint of assembly as well as advantages for maintenance. Refitting concerns, for example, the establishing of a different squeezing contour of the pushers 2 and of the eccentric disks 7 which control them and form the so-called block of laminations as squeezing means. The reference numerals have been applied by analogy, in part without repetition in the text.

The further structure consists therein that the eccentric disks 7 which are arranged one above the other and the pushers 2 are combined to form a package P by the bearing walls 20 arranged at the two ends. This package P which represents the heart of the hose pump can, after release of a barrier 29, be pulled out of the insertable housing 1 in a direction away from the hose. This is done via a rail guide 30.

The package-side portion of this rail guide 30 is based on the use of the bearing walls 20 which represent the upper and lower closures of the said package P, which walls are no longer firmly attached to the insertable housing 1 as in the embodiment of the hose pump described above, but are movable. For this purpose, horizontal guide grooves 31 are present on the longitudinal sides of the two bearing walls 20 which extend parallel to each other. Ledge-like rails 32 of bearing guide plates 33 arranged on the same level engage, in form-fitting manner, into the said grooves. The bearing guide plates 33 are the stationary part of the bearing walls and of the rail guide 30. As can be noted, for instance, from FIG. 14, the two bearing guide plates 33 are fastened by the aforementioned fastening screws 23 to and in the pump housing 28 which receives the insertable housing 1. These fastening screws 23 are screwed in from the side on which the hose 4 extends.

Guide grooves 31 and rails 32 pass furthermore into a further profiling which is mutually taken into account. In order to facilitate the sense of feel and thus the introduction of the bearing walls 20 which form part of the carriage package P, these walls are beveled at their end. This leads to prominent, oblique flanks 34 which extend at an angle of 45° and lead to a trapezoidal or arrow-shaped breast zone of the bearing walls 20.

The niches in the bearing guide walls 33 which are open to the back of the insertable housing 1 and receive the bearing walls 20 bear the reference numeral 35. Their bottom forms the well-defined, functionally correct insertion stop for the package P.

Figure 13:
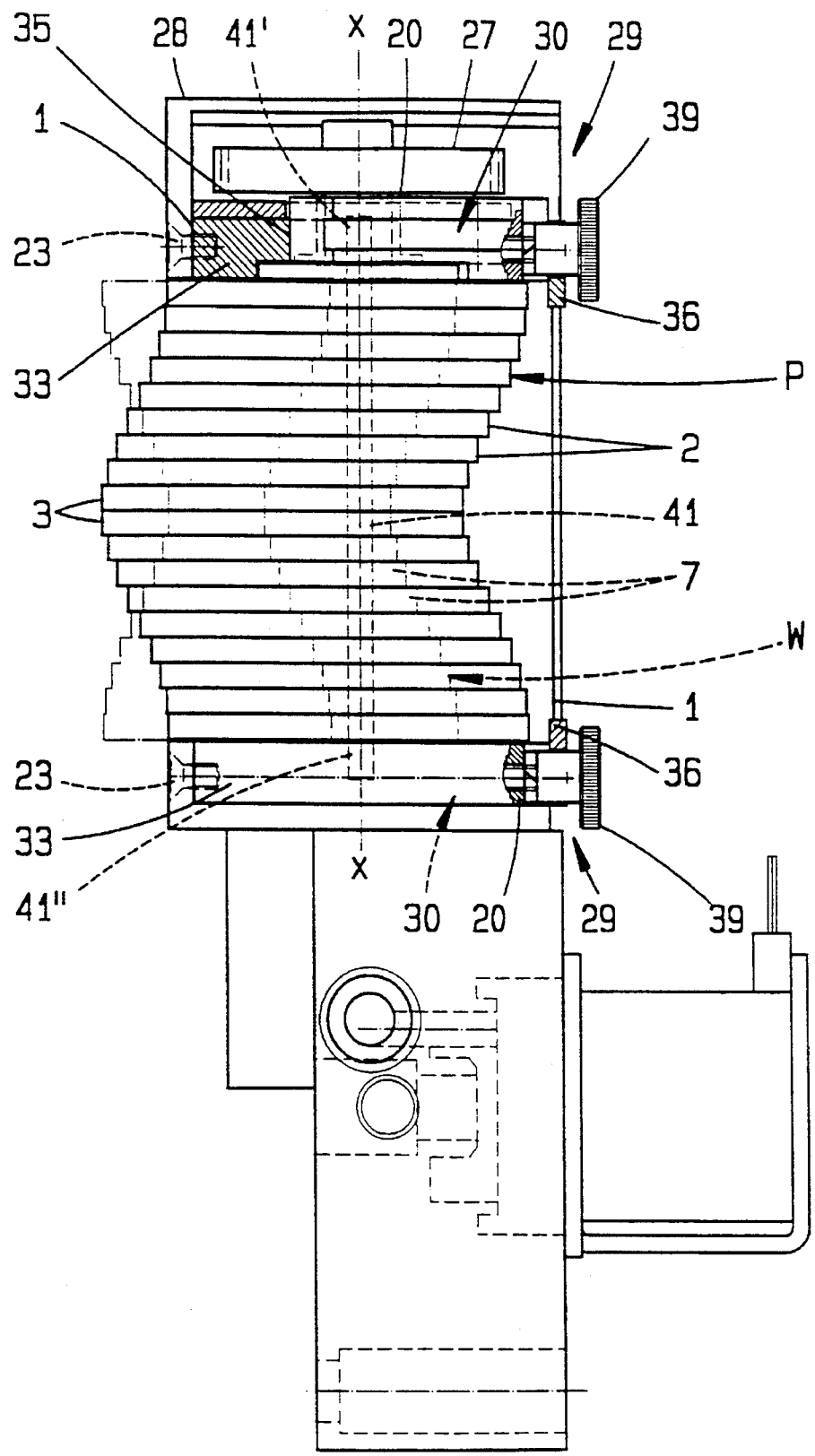
FIG. 13 shows the hose pump developed in accordance with the invention with insertable housing partially disassembled for easy viewing with extractable pusher package, seen in the basic operating position thereof.
Figure 14:
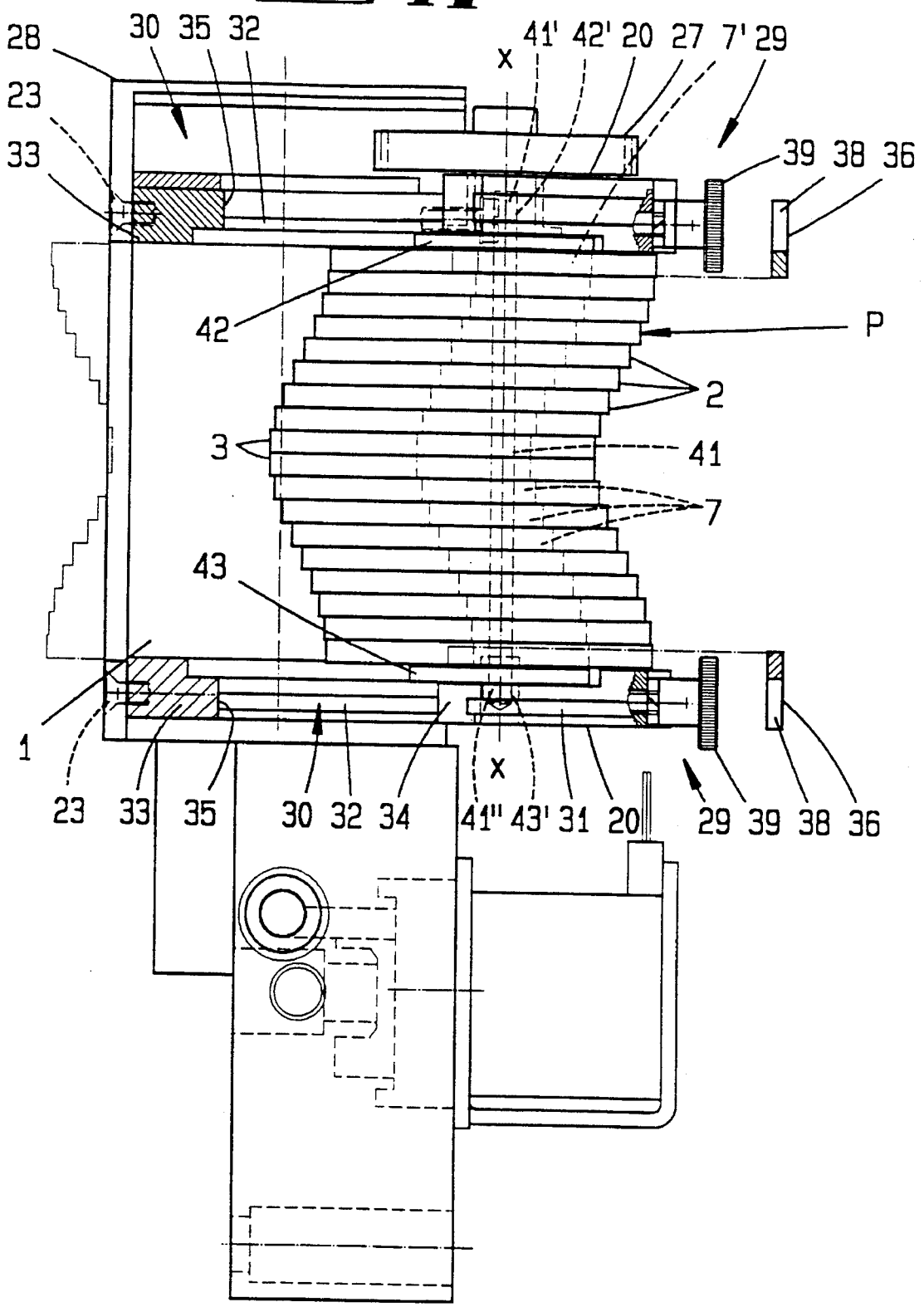
FIG. 14 is an identical showing, but upon the pulling-out of the pusher package.

In order to secure the inserted position of the package P shown in FIG. 13, there is employed the aforementioned barrier 29 which blocks the two bearing walls 20 against being pulled out. For the forming of the barrier 29, which is accordingly provided in pairs there serves in each case a latch plate 36. This plate cooperates with holding screws 37. They are provided in pairs anti screwed into corresponding threaded holes in the bearing guide plates 33. The freestanding horizontal shank section of the holding screws 37 is passed over by cutouts 38 in the latch plates 36 which are open vertically on one side and is clamped fast via the heads of the holding screws 37. The cutouts 38 in the lower latch plate 36 face downward and those in the upper plate upward. It will be understood that after the fastening of the latch plates 36, the niche 35 on the side facing away from the hose 4 is closed, and therefore the carriage which is formed by the entire package P cannot be pulled out.

For its release, there is required a slight unscrewing of the holding screws 37, so that the heads are slightly raised so as to be able to remove the latch plates 36.

Figure 15:
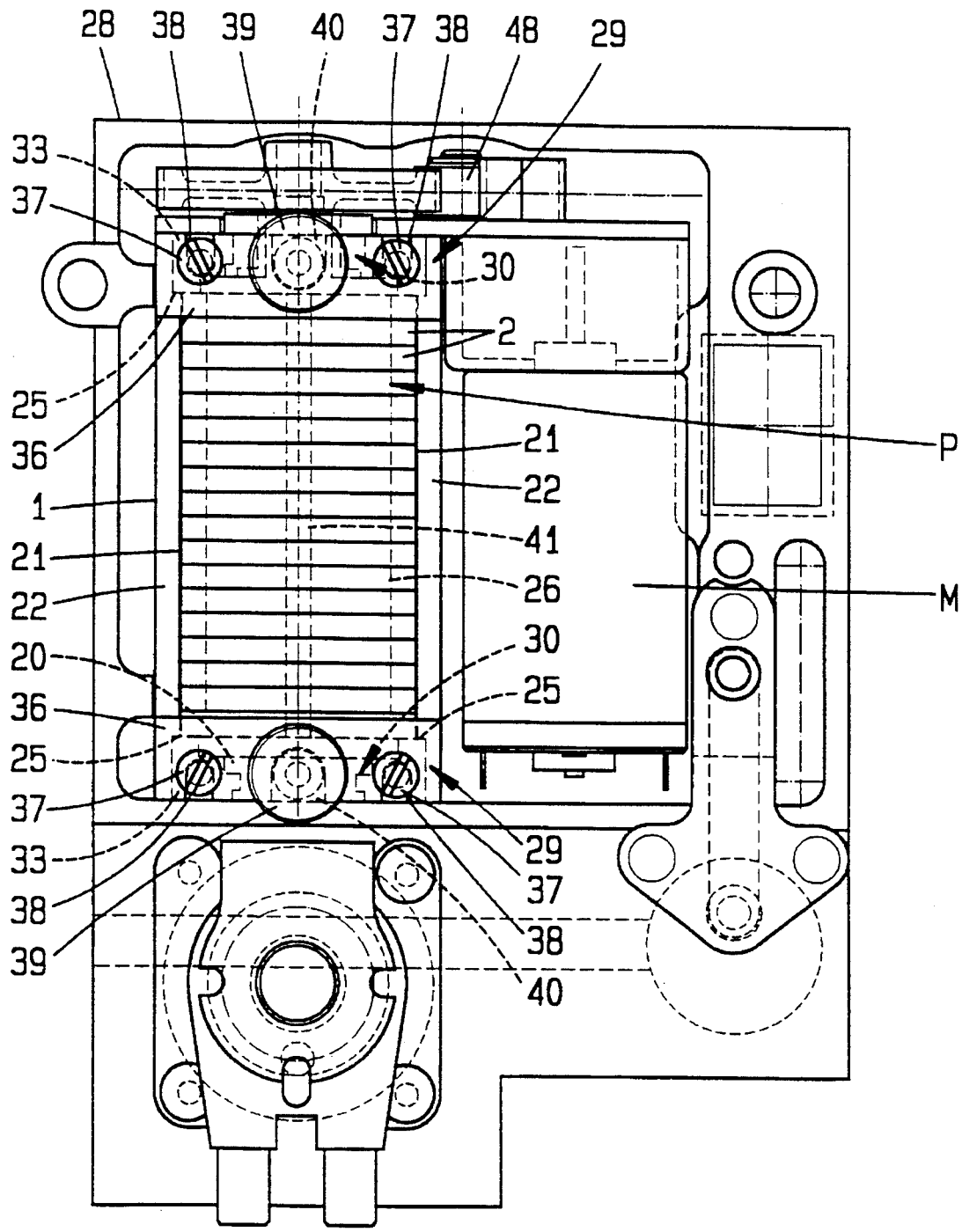
FIG. 15 is a side view of FIG. 13.
Figure 16:
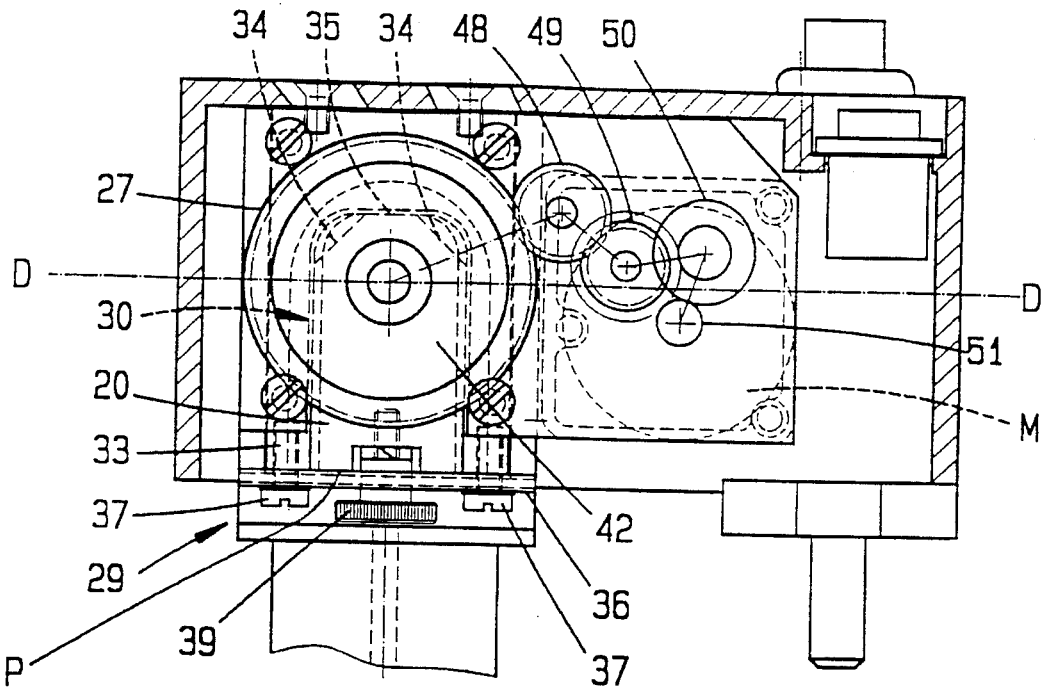
FIG. 16 is a top view thereof, but with the top part of the hose pump cut away.
Figure 17:
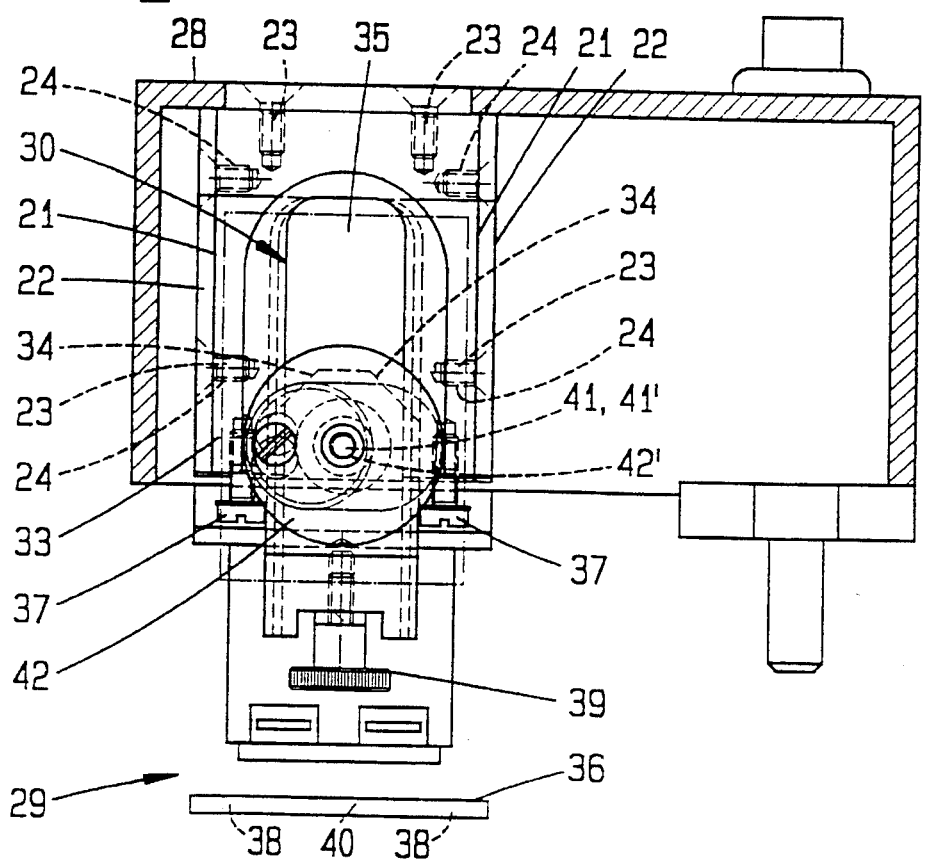
FIG. 17 is the same top view, but upon the pulling out of the pusher package.
Figure 18:
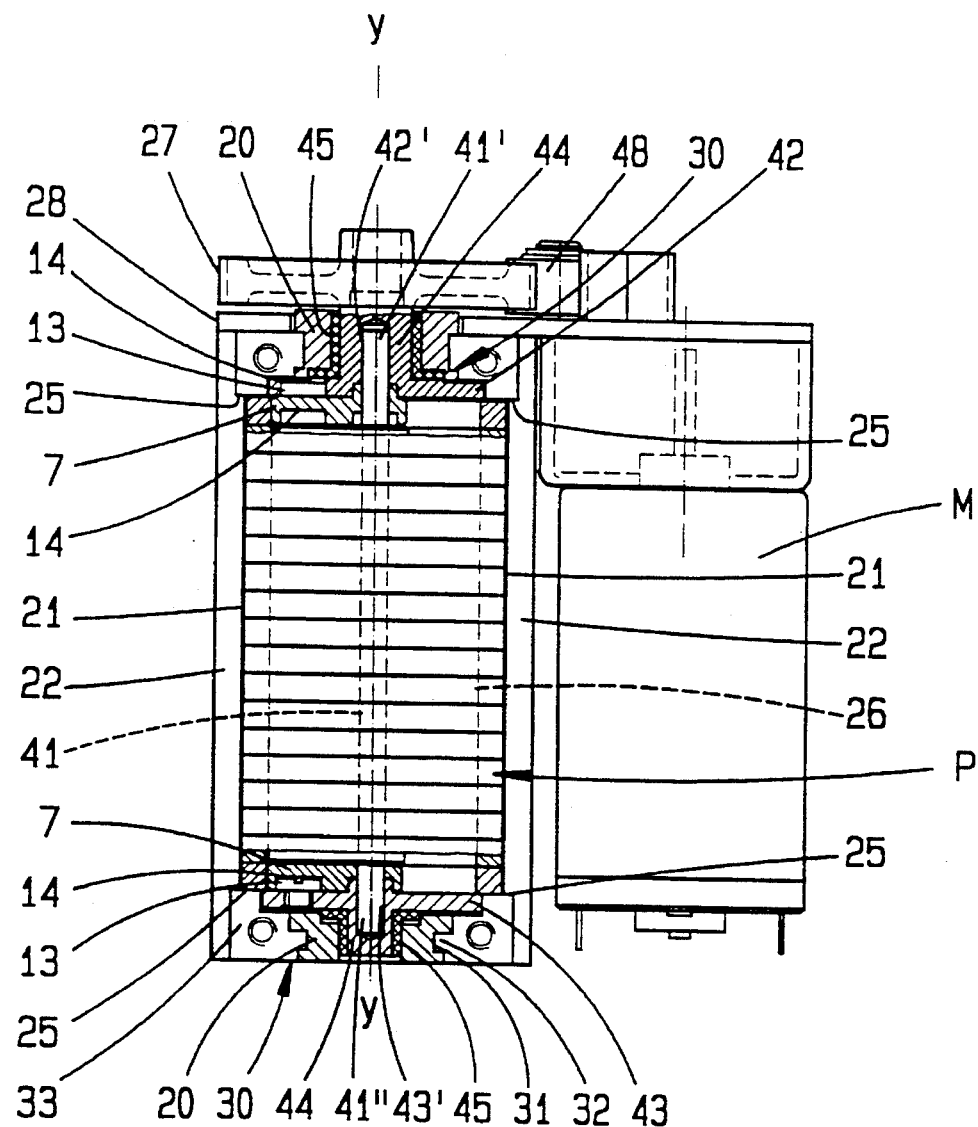
FIG. 18 is a showing similar to FIG. 15 but in section in the region of the bearing walls, the bearing guide plates, and the ends of the connecting bar.
Figure 19:
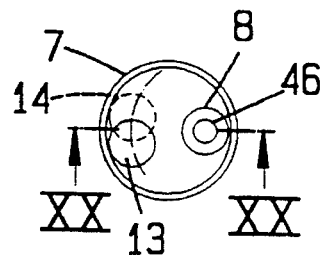
FIG. 19 is a top view of an individual eccentric disk, with indication of an opening for the connecting bar.
Figure 20:
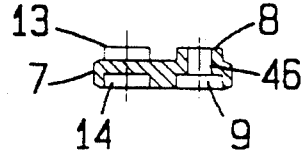
FIG. 20 is a section along the line XX—XX of FIG. 19.

As shown for instance in FIG. 15, pull handles are provided on the outside of the bearing walls 20. They are screws with fluted heads. They extend in space between the horizontally spaced holding screws 37, and therefore also in the covering region of the latch plate 36, which screws, however, for the attachment of the bridge-like latch plate 36 also have cutouts 40 with the same direction of alignment of their openings as described. The pull handles 39 do not require the same slight unscrewing as the holding screws 37 do. Rather, they are held by a washer which secures then for rotation.

So that now the package P which consists of the squeezing means and is already held together to a certain extent by the plug connection of the stub shaft does not, after removal from the insertable housing 1, fall apart even upon somewhat greater mechanical stresses, a connecting bar 41 which passes through the eccentric disks 7 is provided. Its free ends 41' and 41" extend up into the bearing walls 20. Here, a direct connection by frictional lock can be present between the said connecting bar 41 and the bearing walls 20. Preferably, and as also shown in the embodiment, an indirect connection is, however, interposed insofar as here there is interposed in each case a driving or starting disk 42 or 43. The driving or starting disk associated with the upper carriage-forming bearing wall 20 is designated 42. It is mounted with an upward-directed bushing 44 in a lined bearing hole 45 in the bearing wall 20 there (see FIG. 18). The driving or starting disk 42 has, eccentrically to the bushing 44, a hole 14 for the entrance of the correspondingly located insertion pin 13 of the eccentric disk 7 which is directly below it and which, in its turn, also has a hole 14 which is open towards the bottom and which can be developed as a blind hole.

With reference to the stub shaft 8 discussed above, there is present, in the center of the driving- starting disk 42, opening towards the outside, a recess 9 which corresponds to the recess 9 of the eccentric disks 7.

Similar conditions exist an the bottom, in the manner that the driving or starting disk 43 present there also has an insertion pin 13 which, developed here by the head of a screw, engages into the corresponding hole 14 formed now by a blind hole in the eccentric disk 7 lying above it.

The bushing 44 of the lower driving or starting disk 43 is continued upward, and therefore extending over the disk body, in a central stub shaft which corresponds to the stub shaft 8 of the eccentric disks 7. The mounting hole 45 of the lower bearing wall 20 is also lined. From this, there results an advantageously useful friction via which, when the package P is removed, the carriage-forming walls 20 are held on the driving or starting disks 42, 43, which act like a holding plate via connecting rod 41 with sandwich-like clasping between them of the control parts 2, 7.

The receiving holes of the said two driving or starting disks 42, 43 are designated 42' and 43'. They are blind holes and therefore act to limit the insertion. Their edge is beveled.

It remains only to point out that the connecting rod 41 extends in the common axis x—x of the eccentric disks 7. Their stub shaft 8 is drilled through centrally for the passage of the cylindrically-shaped bearing-wall connecting bar 41. The corresponding hole 46 extends up into the recess 9 lying in each case below same or is open towards it.

The upper end of the bushing 44 of the upper driving or starting disk 42 engages, carrying it along in rotation, with the rotary drive wheel, namely the gear wheel 27 of the hose pump. The intermediate gears 48, 49 and 50, which can be noted in FIG. 16, as well the drive pinion 51 of the drive motor M of the hose pump are, however, so arranged that they do not prevent the movement of extraction of the main part of the hose pump, so that an automatic separation of the eccentric-disk rotary-drive wheel 27 takes place upon the removal of the package P. No gear need be taken out of the way. The rotation-imparting gear wheel 48 extends, seen in the direction of pull, behind the diameter D—D of the gear wheel 27 (see FIG. 16).

The disassembly, briefly summarized, is as follows: After a slight loosening of the holding screws 37, the latch plates 36 can be removed (see FIG. 17). With the use of one or both pull handles 39 the entire package P as well as a carriage can be pulled out of the rail guide 30. The holding together described above by means or the connecting rod 41 avoids the parts falling apart. A correspondingly shaped replacement mechanism can then be inserted in the reverse sequence into the insertable housing 1, the tapering of the carriage-forming parts, and therefore of the bearing walls 20, facilitating the connection.

After securing by the barrier 29, the device is ready for operation.

I claim:

1. A hose pump having (a) a tubular hose member (4) extending in a predetermined direction, (b) a plurality of pushers (2) having edges (3) thereof positioned adjacent said hose member (4), the pushers (2) being arranged one behind the other in the predetermined direction of the hose member (4), and (c) a plurality of angularly staggered eccentric disks (7) rotating about a common axis (x—x) extending in the predetermined direction and abutting the pushers (2), the edges (3) of which act in rhythmic alternation on the hose member (4), each of the disks (7) having a stub shaft (8) that projects out from one side of the disk (7) and a recess (9) defined by the other side of disk (7), each stub shaft (8) engaging a corresponding recess (9) on the adjacent disk (7), the common axis (x—x) being defined by a center line of the stub shafts (8).

2. A hose pump according to claim 1 in which an insertion pin (13) projects out of one of the sides of the eccentric disks (7) and the other side of each of the eccentric disks (7) defines a hole (14), each of the insertion pins (13) engaging a corresponding one of the holes (14) on an adjacent eccentric disk (7) thereby locking the staggered arrangement of the eccentric disks (7) and wherein the stub shafts (8), eccentric disks (7), and insertion pins (13) are integral and made of plastic.

3. A hose pump according to claim 1 in which each of the stub shafts (8) has a length less than the depth of the corresponding recess (9).

4. A hose pump according to claim 1 in which the eccentric disks (7) have at their ends closure disks (7') one of which has a journal pin (18) coaxial to tile recess (9) and the other, coaxially opposite the stub shaft (8), also has a journal pin (18).

5. A hose pump according to claim 4 in which the journal pins (18) have bearing walls (20) and the closure disks (7') at the respective ends of the eccentric disks (7) abut the bearing walls (20) thereby axially clamping said eccentric disks (7) together.

6. A hose pump according to claim 5 characterized by the fact that the eccentric disks (7) which are arranged one above the other and the pushers (2) are combined by bearing walls (20) at both ends to form a package (P) which can be removed from an insertable housing (1) via a rail guide (30) of the bearing walls (20) forming a carriage.

7. A hose pump according to claim 6 characterized by the fact that rails (32) of the rail guide (30) are formed on bearing guide planes (33) which can be fixed on the insertable housing (1).

8. A hose pump according to claim 5 including a housing (1), bearing guide plates (33) secured to the housing (1), and rails (32) formed on the bearing guide plates (33) wherein the eccentric disks (7) are arranged one above the other and collectively with the pushers (2) are restrained at both ends thereof by bearing guide walls (20) to form a package (P), the bearing guide walls (20) having grooves (31) slidably receiving rails (32), the package (P) being removable from said housing along the rails (32).

9. A hose pump according to claim 8 including a rotary-drive wheel (27) mounted on one of the guide walls (20) and removably meshing with one of a plurality of intermediate gears (48,49,50) whereby the rotary-drive wheel (27) is separated from the intermediate gears (48,49,50) upon removal of the package (P) from the housing (1).

10. A hose pump according to claim 8 including a latch plate (36) secured to the ends of the bearing guide plates (33) with a plurality of holding screws (37).

11. A hose pump according to including a barrier (29) which secures the bearing walls (20) against being pulled out.

12. A hose pump according to claim 11 including the fact that the barrier (29) is developed as a latch plate (36).

13. A hose pump according to claim 5 wherein the two bearing walls (20) which are arranged one above the other are secured by a barrier (29).

14. A hose pump according to claim 5 including a mounting-wall connecting bar (41) which passes through the eccentric disks (7) and extends up into the bearing walls (20).

15. A hose pump according to claim 14 including a friction-locked connection between connecting bar (41) and bearing walls (20).

16. A hose pump according to claim 14 wherein the connecting bar (41) extends in the common axis (x—x) of the eccentric disks (7).

17. A hose pump according to claim 1 wherein the stub shafts (8) have a polygonal cross-section and the corresponding recesses (9) have a complimentary polygonal cross-section.

* * * * *